United States Patent
Hagenauer et al.

(10) Patent No.: US 9,592,607 B2
(45) Date of Patent: Mar. 14, 2017

(54) METHOD AND PROGRAMMING MEANS FOR MODIFICATION OF A ROBOT PATH

(71) Applicant: KUKA Roboter GmbH, Augsburg (DE)

(72) Inventors: Andreas Hagenauer, Friedberg (DE); Catherine Dangel, Kutzenhausen (DE); Elisabeth Hanke, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 62 days.

(21) Appl. No.: 14/419,095

(22) PCT Filed: Aug. 1, 2013

(86) PCT No.: PCT/EP2013/002320
§ 371 (c)(1),
(2) Date: May 13, 2015

(87) PCT Pub. No.: WO2014/019706
PCT Pub. Date: Feb. 6, 2014

(65) Prior Publication Data
US 2015/0239123 A1 Aug. 27, 2015

(30) Foreign Application Priority Data
Aug. 2, 2012 (DE) .......................... 10 2012 015 437

(51) Int. Cl.
*G06F 19/00* (2011.01)
*B25J 9/16* (2006.01)
*G05B 19/425* (2006.01)

(52) U.S. Cl.
CPC .......... *B25J 9/1664* (2013.01); *G05B 19/425* (2013.01); *G05B 2219/36043* (2013.01); *G05B 2219/36484* (2013.01); *G05B 2219/40519* (2013.01)

(58) Field of Classification Search
USPC .............................................. 700/1, 245–264
See application file for complete search history.

(56) References Cited

U.S. PATENT DOCUMENTS

| 6,178,778 B1 * | 1/2001 | Kenmochi ............ C03B 23/047 65/381 |
| 2003/0033050 A1 * | 2/2003 | Yutkowitz .......... G05B 19/4103 700/189 |

(Continued)

FOREIGN PATENT DOCUMENTS

| CN | 101791801 A | 8/2010 |
| DE | 10161470 A1 | 6/2003 |

(Continued)

OTHER PUBLICATIONS

European Patent Office; Search Report in International Patent Application No. PCT/EP2013/002320 dated Nov. 19, 2013; 4 pages.

(Continued)

*Primary Examiner* — Bhavesh V Amin
(74) *Attorney, Agent, or Firm* — Wood Herron & Evans LLP

(57) ABSTRACT

A method in accordance with the invention for modification of a robot path which has a plurality of path points comprises the following steps of specifying a modification region which has at least two path points of the robot path, specifying a modification of a reference point of the modification region, and automated modification of the modification region, in particular of path points of the modification region, on the basis of the specified modification.

12 Claims, 1 Drawing Sheet

(56) References Cited

U.S. PATENT DOCUMENTS

| | | | | |
|---|---|---|---|---|
| 2003/0120391 A1* | 6/2003 | Saito | B25J 9/1671 | 700/264 |
| 2004/0093119 A1* | 5/2004 | Gunnarsson | B25J 9/1638 | 700/245 |
| 2004/0133309 A1* | 7/2004 | Huttenhofer | B25J 9/1664 | 700/245 |
| 2004/0254677 A1* | 12/2004 | Brogardh | B23K 26/04 | 700/245 |
| 2005/0107921 A1* | 5/2005 | Watanabe | B25J 9/1664 | 700/253 |
| 2006/0178778 A1* | 8/2006 | Fuhlbrigge | B25J 9/1656 | 700/264 |
| 2006/0181236 A1* | 8/2006 | Brogardh | B25J 9/1671 | 318/568.1 |
| 2007/0293962 A1* | 12/2007 | Kimura | G05B 19/4103 | 700/97 |
| 2009/0313370 A1* | 12/2009 | Rhoads | G01S 5/26 | 709/224 |
| 2011/0224815 A1* | 9/2011 | Sonner | B25J 9/1664 | 700/97 |

FOREIGN PATENT DOCUMENTS

| | | |
|---|---|---|
| DE | 10305384 A1 | 8/2004 |
| DE | 102005060967 A1 | 6/2007 |
| DE | 102006022483 A1 | 11/2007 |
| EP | 0852346 A1 | 7/1998 |
| EP | 1399301 A2 | 3/2004 |
| EP | 1465028 A2 | 10/2004 |
| EP | 1531028 A2 | 5/2005 |
| EP | 1724676 A1 | 11/2006 |
| EP | 1862876 A1 | 12/2007 |
| WO | 2007071736 A1 | 6/2007 |

OTHER PUBLICATIONS

German Patent Office; Search Report in German Patent Application No. 10 2012 015 437.2 dated May 7, 2013; 5 pages.

Chinese Patent Office; Examination Report in Chinese Patent Application No. 2013800517011 dated Jan. 25, 2016; 15 pages.

* cited by examiner

METHOD AND PROGRAMMING MEANS FOR MODIFICATION OF A ROBOT PATH

TECHNICAL FIELD

The present invention relates to a method and a programming means for the modification of a robot path.

BACKGROUND

Robot paths have in general a plurality of path points. These may be taught, in particular manually, i.e. by manually running up to them with the robot and saving them, or also generated automatically, for example from the CAD data of a robot-supported workpiece to be processed or the like.

It may be necessary to modify robot paths of this type. For example, a new obstacle in the working space of the robot, for example an additional shelf, may necessitate bypassing of the obstacle during transport of a workpiece by the robot. Similarly, the workpieces to be processed and/or the process paths may change, in particular locally, due to revisions of the assigned products.

Up until now, the individual path points of the specified robot path must be individually sequentially modified for this purpose according to company-specific practice, for example, by replacing them with newly taught points. A sequential modification of individual path points of this type is not only very expensive and prone to errors, but also often leads to an undesired change of the remaining robot path in the vicinity of the respectively recently modified path point. Therefore, modifications of this type currently generally demand a high level of experience on the part of the user.

SUMMARY

It is the object of the present invention to improve a modification of a specified robot path.

A programming means in the sense of the present invention can be configured as hardware and/or software technology. It can, in particular, be a program, a program module, and/or a programming environment, which executes an inventive method or is directed to the execution thereof; if it is executed or is installed in a computer, it may have, in particular be, a data medium or a storage medium with a program, program module, or a programming environment of this type, and/or a computer with a memory, a processing unit, and input/output means, which is directed to the execution of an inventive method.

According to one aspect of the present invention, for the modification of a robot path, which has a plurality of specified path points, a specification of a modification region, which has two or more path points of the robot path, a specification of a modification of a reference point of the modification region, and an automated modification of the modification region, in particular of path points of the modification region, is provided on the basis of the specified modification.

For this purpose, the operator only has to modify one reference point in order to modify a modification region having a plurality of path points, instead of modifying the path points individually as previously. In addition, the modification of the modification region may be improved by the automated modification of the modification region on the basis of the specified modification of the reference point. For example, in an embodiment, a reaction to a modification of one path point is prevented in an adjacent path point, as this may occur during the previously applied sequential modification of individual path points. Stated more simply, the user may, for example, displace a reference point and by this means affect a corresponding displacement on further path points of the modification region.

A robot path in the sense of the present invention has two or more specified path points and may, in particular, comprise a path regulation between path points P1, P2, . . . , for example the specification of a linear or circular movement between or through path points. In an embodiment, the robot path, in particular one or more of sections of the robot path, is specified by a spline function, in particular by a spline function of third or fifth degree or a b-spline function. A path point may in particular lie on the specified robot path. Similarly, the robot path may also have path points and be specified by these, which do not lie directly on said robot path, but instead are blended.

A path point in the sense of the present invention may comprise one or more coordinates which define, at least partially, a pose of the robot. In particular, a path point in the working space of the robot may describe a location and/or orientation of a reference system linked to the robot, in particular the TCP. For example, a path point may consist of three, in particular Cartesian, cylindrical, or polar coordinates, which describe the location of the TCP so that path points and the corresponding robot path specified by them are three-dimensional. Additionally or alternatively, a path point may have three coordinates, in particular EULER or CARDAN angles, which describe the orientation of the TCP so that path points and the corresponding robot path specified by them are three- or six-dimensional. Similarly, a path point in the coordinate space of the robot may describe the position of one or more axes or joints of the robot, in particular the angular positions, or angular locations of pivot joints and/or the travel range of linear axes. For example, path points and the robot path specified by them for a six-axes robot may describe six axis positions thereof and thus are in turn six-dimensional.

A modification region may be specified in an embodiment in that a path point of the robot path may be specified, in particular selected, as a start point and a further path point of the robot path may be specified as an end point of the modification region. Similarly, a segment or length of the robot path may be specified, around which a start point and/or end point of the modification region is located upstream or downstream of a specified, in particular selected, path point of the robot path in the execution direction. For example, a path point may be selected within the specified modification region and a start point of the modification region may be specified by a first segment, which start point is located by this segment upstream of the selected path point of the robot path, and an end point of the modification region may be specified by a second segment, which end point is located by this segment downstream of the selected path point of the robot path.

Similarly, two path points of the robot path may also be selected and specified by a first and a second segment, at which distance to the one path point the start point is located, and at which distance to the other path point the end point of the modification region is located. A specified segment may be a real number, in particular also equal to zero, negative, and/or rational. A modification region may thus correspond in particular to the entire robot path or to proper subset or to a proper subsection of the same.

In an embodiment of the present invention, a modification region may additionally also be specified, which only has this specified path point of the robot path, in particular by selection of a path point of the robot path and specification of a first and second segment for the start or end point of the modification region, which segments are smaller than the distance of the adjacent path points to this path point. In this way, the previous functionality of being able to modify a single path point may also be integrated. In this respect, a specification of a modification region, which has two or more path points of the robot path, is presently understood in particular to mean that the method or programming means has the possibility to (also) specify modification regions of this type using two or more path points, which are then jointly modified.

Prior to, with, or after a specification of the modification region, a modification of a reference point of the modification region is specified. In an embodiment, this may include the specification, in particular selection, of a path point to be modified of the modification region, wherein the reference point may be identical to the specified path point to be modified, or may be arranged in a specified location to the same, in particular at a specified segment upstream or downstream of the same on the robot path. For example, in a refinement, a modification region may be specified by two adjacent path points of the robot path as start point or end point, and the middle of the robot path between these path points may be specified as a reference point, so that both path points are similarly modified by modification of said reference point.

Prior to, with, or after a specification of the reference point, the modification of this reference point may be specified in an embodiment. This may be carried out in a refinement in that a modified path point is specified to which the reference point is to be displaced. For example, a user may specify a modified path point, in particular by means of a teaching or manual run up and saving of this modified path point, and specify that the reference point is to be displaced to this taught or modified path point. Similarly a modification operation may be parameterized for the reference point. For example, a direction and/or segment may be specified by which the reference point is to be displaced. In a refinement, a plurality of modification operations are made available to the user, from which he may select and preferably parameterize one or more, for example, a (parameterizable) displacement on or parallel to the robot path, perpendicular or at a specifiable or parameterizable angle to the same, in a specified or specifiable or parameterizable direction in the working or coordinate space or the like.

Additionally or alternatively, in an embodiment, a modification operation for the modification region, in particular path points thereof, may be specified, in particular parameterized, and/or selected from a number of a plurality of specified modification operations. A modification operation for the modification region in the sense of the present invention may describe, in particular, the modification of the modification region, in particular the path points thereof, on the basis of or as a function of a modification operation of the reference point.

Thus, in an embodiment, the modification region, in particular the path points thereof, may be changed in parallel to a change of the reference point. A change is understood presently in particular as a displacement of a point in the working or coordinate space, and a parallel change as correspondingly in particular a parallel displacement. Figuratively stated, one or more, in particular all path points of the modification region, may be moved, in particular, displaced together with the reference point.

In a refinement, in particular, a change of this type may be scalable, preferably parameterized or specifiable by specification of one or more parameters. A scalable or scaled change is understood presently in particular as a change of a path point of the modification region as a function of a change of the reference point and/or the distance between the path point and the reference point. Thus, for example, a displacement of the path point of the modification region may depend linearly or nonlinearly on the distance of the path point to the reference point and/or on a start point and/or end point, in particular according to a function which vanishes in the vicinity of a start point and an end point of the modification region, and is a maximum in the vicinity of the reference point. In this way, the modification region is not changed or only changed a little in the vicinity of the start point and end point, and maximally changed in the vicinity of the reference point, for example in the same way as the reference point.

Additionally or alternatively, a multitude of selectable and/or parameterizable modification operations for the modification region, in particular of the path points thereof, may comprise a smoothing of the modification region. A smoothing is understood presently in particular in a customary way as a reduction of maximum gradients or directional changes of the modification region or of the robot path between the specified or modified path points, in particular thus a damping of oscillations of the robot path between the specified or modified path points. A smoothing of this type may, for example, be implemented by a low pass filtering of a FOURIER transformation of the modification region. Similarly, the modified robot path may be specified in the modification region, for example, by a spline or BEZIER curve, which is defined by the modified path points, generally thus the modification of a path regulation between path points of the modification region.

Prior to, with, or after a specification of a modification region and a modification of a reference point of the modification region, the modification region is automatically modified on the basis of the specified modification. This is understood presently in particular to mean that path points of the modification region and/or path regulations between path points of the modification region are modified corresponding to the specified modification, in particular corresponding to a selected and/or parameterized modification operation. If, for example, a displacement of the path points of the modification region parallel to a displacement of the reference point is specified as a modification operation for the modification region, and a displacement perpendicular to the robot path is specified as a modification operation for the reference point, all path points of the modification region are automatically displaced parallel to the displacement of the reference point and perpendicular to the robot path.

According to an embodiment, a region of the robot path which abuts the modification region remains at least substantially unchanged during the modification of the modification region. This can be achieved in particular in that a modification at the edge of the modification region, for example through a corresponding scaling, which may be weighted using a distance to an edge or start point or end point of the modification region, approaches zero or vanishes, so that the robot path abutting the modification region transitions unchanged into this unchanged edge of the modification region. Additionally or alternatively, for example by specification of a corresponding limiting condition, a "freezing", or the like of the regions of the robot path abutting the modification region, a change to this region may be suppressed.

According to an embodiment, the specification of the modification region and/or of the modification and/or the modifying of the modification region is carried out interactively. This is understood in particular to mean that a result of a corresponding specification is displayed, in particular displayed visually, to the user. For example, after a specification of the modification region, reference point, and a modification operation for the modification region, a change or modification of the modification region corresponding to a change of the reference point may be displayed; for example, a displacement by means of an input, a modification by dragging a visual presentation of the reference point using a mouse or the like may be displayed, so that the user obtains feedback or information about how the specified modification affects it.

Specified, in particular, taught path points are used multiple times in some circumstances for the specification of a robot path. Thus, for example, the same path point may be specified or used as start point and end point of a robot path. According to an embodiment, during a modification of a modification region, a path point of this type used multiple times is to be modified on the one hand in its use for the specification of the modification region, on the other hand it is to remain unchanged in its use for the specification of the robot path outside of the modification region. If, for example, only the end of a robot path is to be modified, the start point and end point of which are specified by the same taught path point, on the one hand this path point is to be modified in its use as an end point in order to modify the end of the robot path, on the other hand it is not modified in its use as a start point in order to leave the start of the robot path unchanged. Therefore, in an embodiment, one or more path points of the modification region are duplicated and the duplicate(s) are automatically modified based on the specified modification, wherein the modification region is specified by the modified duplicate(s). In this way, the modification region may be modified—by the modification of the duplicates specified for it—while on the other hand the specified path points themselves remain unchanged by the specified remaining robot path.

BRIEF DESCRIPTION OF THE FIGURES

Further advantages and features arise from the subclaims and the exemplary embodiments illustrated in the accompanying drawings.

DETAILED DESCRIPTION

Figure 1:
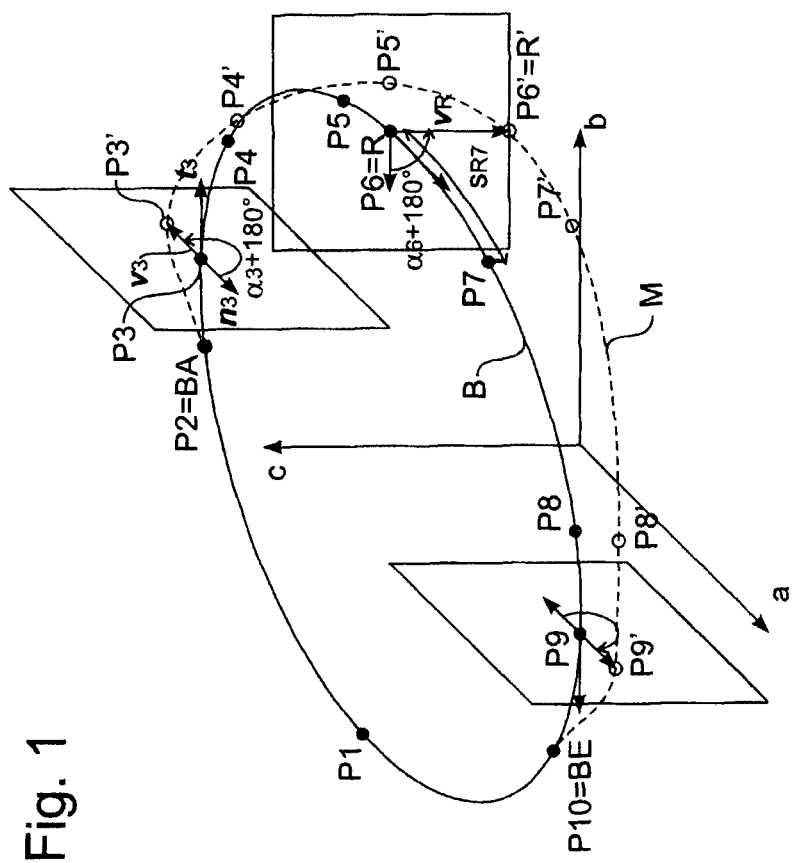
FIG. 1 shows a robot path modified by means of a method according to FIG. 2.

FIG. 1 shows a robot path B, which has been specified by the 10 specified, for example, taught points P1, . . . P10 (compare FIG. 2: Step S10). The points may, for example, represent Cartesian points in the working space and describe the location of the TCP of a robot. In this case, the three represented coordinate axes a, b, c, may be considered as three spatial directions of the working space. Similarly, the points may also represent the orientation or location and orientation of the TCP in the working space, or the joint positions of the robot in the coordinate space. These may, in particular, be six-dimensional, whereby for clarity and more compact representation, only three dimensions, a, b, c, are shown.

A robot path is specified by the points by means of a path regulation, for example, by a spine function, approximately in the form:

```
...
SPLINE
    SPL P1
    SPL P2
    ...
    SPL P10
    SPL P1
ENDSPLINE
...
```

Figure 2:
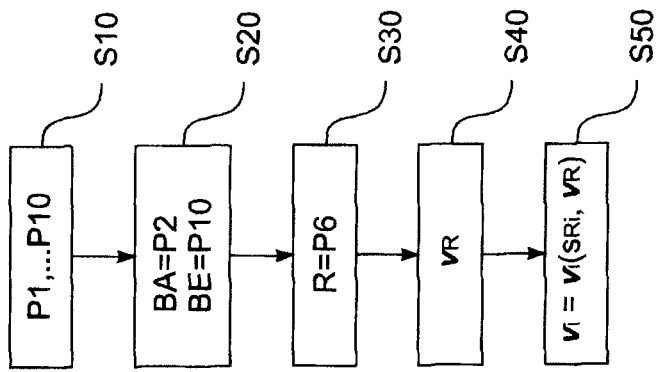
FIG. 2 shows a method for the modification of a robot path according to an embodiment of the present invention.

According to a method according to an embodiment of the present invention, which is represented in FIG. 2, or by means of a programming means which is directed to implementing this method, a user may initially specify a modification region M in a Step S20, shown in the embodiment exemplarily by selection of point P2 as start point BA and point P10 as end point BE.

Previously, during, or afterwards, the user may select, in a Step S30, a path point to be modified of the modification region as reference point R, shown in the embodiment exemplarily by path point P6 (R=P6).

Previously, during, or afterwards, the user may, in a Step S40, select and parameterize a modification operation $v_R$ for the reference point, in the embodiment a displacement by a specified amount in a specified direction. Similarly, the user might also specify, for example teach, the modified path point R' and thus specify modification operation $v_R$ for the reference point.

Previously, during, or afterwards, the user may, in a Step S50, select and parameterize a modification operation $v_i$ for the modification region, in the embodiment a displacement by a specified amount in a specified direction. The amount of the displacement and the angle may thereby depend, for example, on a distance between the path point and the reference point, and may optionally be scaled to the entire length of the modification region. In the embodiment, segment $s_{R7}$ between (not modified) reference point R and path point P7 of the modification region is delineated for this purpose in FIG. 1 exemplarily for point P7. From the exemplarily represented displacements of path points P3 and P9, it is clear that the angle of the displacement, which is carried out perpendicular to a unit tangent vector t on the robot path in a direction that is rotated by an angle α+180° counter to a unit normal vector n at the robot path, thus varies, like the amount of the displacement, with the distance to reference point R, standardized to the total length of the modification region, that angle α and the amount [of displacement] vanish at the start and end of the modification region, and reach their maximum (according to amount) at reference point R. In this way, the robot path [R10, R2], remains unchanged outside of modification region M.

This modification operation $v_i = v_i(s_{Ri}, v_R)$, is purely exemplary. Similarly, a multitude of selectable and/or parameterizable modification operations for the modification region may include a displacement of all path points of the modification region parallel to the specified displacement of the reference point, optionally scaled to the distance between path point and reference point, optionally standardized to the total length or total segment of the modification region. Additionally or alternatively to a specification of a displacement in one direction, which is rotated by a specified angle α counter to the normal path of the robot path, a modification operation for the modification region may comprise a displacement of all path points by a specified amount along a specified curve, in particular, a straight section, in the working or coordinate space and/or in a direction perpendicular to this, which is rotated counter to the direction of the displacement of the reference point by a specified angle. This corresponds substantially to the modification operation represented in FIG. 1, wherein, however, the displacement direction is not specified relative to the robot path, but instead relative to the curve, in particular, the straight section in the working and coordinate space a, b, c; the angle is not specifiable, in particular parameterizable, with respect to the normal path, rather the displacement direction of the reference point, and additionally a displacement in the direction of these curves, in particular, straight sections.

The parameterization may, for example, be carried out in that the user specifies a parameter μ, which describes the displacement amount |v| or the rotational angle α as a function of the section $s_{Ri}$ between the respective path point $P_i$ (i=2, . . . 10) and the reference point R, standardized to the length or segment $s_{2R}$ or $s_{R10}$ of the partial modification region, on which the path point P2, . . . , P10 is located:

$$|v|, \alpha = \mu(s_{Ri}, s_{2R}, s_{R10}).$$

μ is preferably configured hereby in such a way that μ vanishes at P2 and P10, and assumes the maximum amount at P6=R, wherein μ preferably behaves conversely like in segment $s_{Ri}$.

After the modification region M has been specified with the path points P2=BA, P3, . . . , P9, P10=BE and the modification $v_R$ of reference point R=P6, then in Step S50, the modification region M is automatically modified by the programming means, in particular path points P2, . . . , P10 thereof, corresponding to the specified, in particular selected and parameterized, modification operation $v_i = v_i(s_{Ri}, v_R)$, and thus based on the specified modification.

It is clear that even users with little training may, in this way, easily, in a fail-safe way, and quickly modify entire path regions M of robot path B, in that they only modify one path point R=P6. Advantageously, no undesired reactions arise within or outside of the modification region.

LIST OF REFERENCES

B Robot path
M Modification region
P1, . . . , P10 Path point
R Reference point
v Displacement (change, modification (operation))
$s_{ij}$ Segment between path points i, j
t Unit tangent vector
n Unit normal vector

What is claimed is:

1. A method for the modification of a robot path having a plurality of path points, the method comprising:
   specifying a modification region which has at least two path points;
   specifying a modification of a reference point of the modification region; and
   automatically modifying the modification region on the basis of the specified modification;
   wherein at least one of:
   a) specifying a modification of a reference point of the modification region comprises at least one of:
      selecting a modification operation for at least one of the reference point or for the modification region, or
      at least one of selecting or parameterizing a modification operation for the modification region,
      wherein selecting or parameterizing a modification operation comprises selecting or parameterizing at least one of a set of selectable or parameterizable modification operations, and
      wherein at least one of the set of modification operations comprises changing at least one path point of the modification region on the basis of a change of the reference point; or
   b) at least one path point of the modification region is a duplicate of another path point, and the at least one duplicate is automatically modified on the basis of the specified modification.

2. The method of claim 1, wherein modifying the modification region comprises modifying the path points of the modification region.

3. The method of claim 1, wherein specifying a modification of a reference point of the modification region comprises at least one of:
   selecting a path point of the modification region to be modified, or
   specifying a modified path point.

4. The method of claim 1, wherein changing at least one path point of the modification region comprises at least one of a parallel change or scaled change of the at least one path point.

5. The method of claim 4, wherein the scaled change of a path point of the modification region comprises a change of the path point on the basis of a distance between the path point and the reference point.

6. The method of claim 1, wherein at least one of the set of modification operations comprises a smoothing of the modification region.

7. The method of claim 1, wherein specifying a modification region comprises specifying a path point of the robot path and at least one of a further path point or a segment of the robot path.

8. The method of claim 1, wherein a region of the robot path that abuts the modification region remains at least substantially unchanged at the modification of the modification region.

9. The method of claim 1, wherein the robot path is specified at least sectionally by a spline function.

10. The method of claim 1, wherein at least one of specifying a modification region, specifying a modification, or automatically modifying the modification region is carried out interactively.

11. A computer for modifying a robot path having a plurality of path points, the computer comprising a non-transitory storage medium including program code that, when executed by the computer, causes the computer to:
   specify a modification region which has at least two path points;
   specify a modification of a reference point of the modification region; and
   automatically modify the modification region on the basis of the specified modification;
   wherein at least one of:
   a) specifying a modification of a reference point of the modification region comprises at least one of:
      selecting a modification operation for at least one of the reference point or for the modification region, or
      at least one of selecting or parameterizing a modification operation for the modification region,
      wherein selecting or parameterizing a modification operation comprises selecting or parameterizing at least one of a set of selectable or parameterizable modification operations, and
      wherein at least one of the set of modification operations comprises changing at least one path point of the modification region on the basis of a change of the reference point; or
   b) at least one path point of the modification region is a duplicate of another path point, and the at least one duplicate is automatically modified on the basis of the specified modification.

12. A computer program product for modifying a robot path having a plurality of path points, the computer program product having programming code stored on a non-transitory machine readable data medium, the programming code configured to, when executed by a computer, cause the computer to:
- specify a modification region which has at least two path points;
- specify a modification of a reference point of the modification region; and
- automatically modify the modification region on the basis of the specified modification;
- wherein at least one of:
- a) specifying a modification of a reference point of the modification region comprises at least one of:
  - selecting a modification operation for at least one of the reference point or for the modification region, or
  - at least one of selecting or parameterizing a modification operation for the modification region,
  - wherein selecting or parameterizing a modification operation comprises selecting or parameterizing at least one of a set of selectable or parameterizable modification operations, and
  - wherein at least one of the set of modification operations comprises changing at least one path point of the modification region on the basis of a change of the reference point; or
- b) at least one path point of the modification region is a duplicate of another path point, and the at least one duplicate is automatically modified on the basis of the specified modification.

* * * * *